(12) United States Patent  (10) Patent No.: US 8,989,921 B2
Nannoni et al.  (45) Date of Patent: Mar. 24, 2015

(54) ELECTRONIC FLIGHT CONTROL SYSTEM FOR AN AIRCRAFT CAPABLE OF HOVERING

(75) Inventors: Fabio Nannoni, Novara (IT); Pierre Abdel Nour, Vergiate (IT); Marco Cicale', Busto Arsizio (IT)

(73) Assignee: Agustawestland S.p.A., Samarate (IT)

( * ) Notice: Subject to any disclaimer, the term of this patent is extended or adjusted under 35 U.S.C. 154(b) by 496 days.

(21) Appl. No.: 13/377,308

(22) PCT Filed: Jun. 10, 2010

(86) PCT No.: PCT/IB2010/001396
§ 371 (c)(1),
(2), (4) Date: Mar. 7, 2012

(87) PCT Pub. No.: WO2010/143051
PCT Pub. Date: Dec. 16, 2010

(65) Prior Publication Data
US 2012/0153074 A1     Jun. 21, 2012

(30) Foreign Application Priority Data
Jun. 10, 2009  (IT) .............................. TO20090079 U

(51) Int. Cl.
*G01C 23/00*   (2006.01)
*G05D 1/00*    (2006.01)
(Continued)

(52) U.S. Cl.
CPC .............. *G05D 1/0858* (2013.01); *B64C 27/57* (2013.01)
USPC ................ 701/3; 701/1; 701/4; 701/5; 701/6; 701/11; 701/14; 701/15; 701/16; 701/17; 701/18

(58) Field of Classification Search
CPC .... B64C 27/463; B64C 27/001; B64C 27/57; G05D 1/0669; G05D 1/0858; G05D 1/06; G05D 1/08; G01C 5/00
USPC ................................... 701/1, 3, 4–11, 14–18
See application file for complete search history.

(56) References Cited

U.S. PATENT DOCUMENTS 3,711,042 A * 1/1973 Rempfer et al. ............... 244/175
4,217,486 A * 8/1980 Tawfik et al. ..................... 700/4
(Continued)

FOREIGN PATENT DOCUMENTS

WO   WO 2008/048245   4/2008

OTHER PUBLICATIONS

International Search Report Application No. PCT/IB2010/001396, dated Nov. 16, 2011.

*Primary Examiner* — Bhavesh V Amin
(74) *Attorney, Agent, or Firm* — Ohlandt Greeley Ruggiero & Perle L.L.P.

(57) ABSTRACT

An electronic flight control system for an aircraft capable of hovering and having at least one rotor. The flight control system is configured to operate in a manual flight control mode, in which the flight control system controls rotor speed in response to direct commands from the pilot; and in at least two automatic flight control modes corresponding to respective flight modes of the aircraft, and in which the flight control system controls rotor speed automatically on the basis of flight conditions. The flight control system is also configured to memorize, for each automatic flight control mode, a respective flight table relating different speed values of the rotor to different values of at least one flight quantity; and to automatically control rotor speed in the automatic flight control modes on the basis of the respective flight tables.

12 Claims, 5 Drawing Sheets

(51) Int. Cl.
*G06F 7/00* (2006.01)
*G05D 1/08* (2006.01)
*B64C 27/57* (2006.01)

(56) References Cited

U.S. PATENT DOCUMENTS

| | | | | |
|---|---|---|---|---|
| 4,500,967 A | * | 2/1985 | Murphy et al. | 701/12 |
| 4,527,242 A | * | 7/1985 | McElreath et al. | 701/11 |
| 4,807,129 A | * | 2/1989 | Perks | 701/3 |
| 4,947,334 A | * | 8/1990 | Massey et al. | 701/3 |
| 5,001,646 A | * | 3/1991 | Caldwell et al. | 701/7 |
| 5,314,147 A | * | 5/1994 | Ebert et al. | 244/182 |
| 5,428,543 A | * | 6/1995 | Gold et al. | 701/5 |
| 5,666,110 A | | 9/1997 | Paterson | 340/970 |
| 5,716,032 A | * | 2/1998 | McIngvale | 244/185 |
| 5,738,300 A | * | 4/1998 | Durand | 244/17.13 |
| 6,189,836 B1 | * | 2/2001 | Gold et al. | 244/191 |
| 6,198,991 B1 | * | 3/2001 | Yamakawa et al. | 701/16 |
| 6,259,975 B1 | * | 7/2001 | Rollet et al. | 701/3 |
| 6,527,225 B1 | * | 3/2003 | Silder et al. | 244/76 R |
| 6,671,590 B1 | * | 12/2003 | Betzina et al. | 701/3 |
| 6,691,950 B2 | * | 2/2004 | Salesse-Lavergne | 244/17.13 |
| 7,195,200 B2 | * | 3/2007 | Yamane | 244/76 R |
| 7,367,531 B2 | * | 5/2008 | Greene | 244/195 |
| 7,555,371 B2 | * | 6/2009 | Lebrun et al. | 701/11 |
| 2003/0066926 A1 | * | 4/2003 | Salesse-Lavergne | 244/17.13 |
| 2003/0066927 A1 | * | 4/2003 | Salesse-Lavergne | 244/17.13 |
| 2004/0093130 A1 | * | 5/2004 | Osder et al. | 701/3 |
| 2004/0107027 A1 | * | 6/2004 | Boudrieau | 701/1 |
| 2005/0004723 A1 | * | 1/2005 | Duggan et al. | 701/24 |
| 2006/0253230 A1 | | 11/2006 | Fanciullo et al. | |
| 2007/0282493 A1 | * | 12/2007 | Fanciullo et al. | 701/4 |
| 2008/0234881 A1 | | 9/2008 | Cherepinsky et al. | |
| 2012/0153074 A1 | * | 6/2012 | Nannoni et al. | 244/17.13 |

* cited by examiner

ELECTRONIC FLIGHT CONTROL SYSTEM FOR AN AIRCRAFT CAPABLE OF HOVERING

TECHNICAL FIELD

The present invention relates to an electronic flight control system for an aircraft capable of hovering, in particular a helicopter equipped with a main rotor and a tail rotor, to which the present invention refers purely by way of example.

BACKGROUND ART

Helicopters are known comprising a main rotor and a tail rotor connected to each other and rotated by one or more engines.

When powered, the main and tail rotors operate in substantially three ranges: a normal (steady) operating range, in which rotor speed (rpm) normally ranges between 96% and 102% of a given nominal speed; a lower operating range, in which rotor speed normally ranges between 90% and 96%; and an upper operating range, in which rotor speed normally ranges between 102% and 106%. These rotation speeds are obviously only indicative, in that different helicopters have different percentage operating ranges.

Automatic systems are known, as described, for example, in WO 2008/48245, for reducing the noise generated by helicopters, by reducing main and tail rotor speed. The noise generated by the rotors increases rapidly alongside an increase in speed (rpm), and automatic systems operate on the basis of parameters, such as flight altitude and speed and air temperature, to assist the pilot in adjusting rotor speed to achieve a desired low-noise level.

OBJECT AND SUMMARY OF THE INVENTION

The Applicant has observed that, to ensure safe flight, automatic electronic flight control systems have to process a considerable amount of data. In given environmental and/or flight attitude conditions, switching from low to high rotor speed may result in loss of control of, or damage to, the helicopter, and the reverse is also equally critical. Reducing rotor speed in unsuitable flight conditions may result in unrecoverable loss of control of the helicopter. Operationwise, electronic flight control systems are also fairly rigid, by simply automatically controlling high to low or low to high speed switching of the main and tail rotors on the basis of one or more types of flight information, and are unsuitable for missions calling for maximum automatic flight control even in critical conditions. Such systems, in fact, are limited to simply disabling automatic switching from high-noise (high-rotor-speed) mode to low-noise (low-rotor-speed) mode, and vice versa, unless certain conditions are complied with.

The scope for personalized missions and automatic flight control in critical conditions is therefore fairly limited, and mission profiles cannot be defined and automated both efficiently and safely.

The Applicant has therefore devised an electronic flight control system, which provides for automatically controlling the speed of one or more rotors of an aircraft safely, and in a highly flexible, mission-adaptable manner.

It is an object of the present invention to provide an electronic flight control system, for an aircraft capable of hovering, designed to eliminate the aforementioned drawbacks of the known art.

According to the present invention, there are provided an electronic flight control system for an aircraft capable of hovering; an aircraft equipped with such an electronic flight control system; and software for an electronic flight control system for an aircraft capable of hovering, as defined in the accompanying claims.

DETAILED DESCRIPTION OF PREFERRED EMBODIMENTS OF THE INVENTION

The present invention will be described in detail with reference to the attached drawings, to enable an expert to produce and use it. As will be clear to anyone skilled in the art, changes may be made to the embodiments described, and the general principles described may also be applied to other embodiments and applications without, however departing from the protective scope of the present invention as defined in the accompanying claims. The present invention, therefore, is not to be considered limited to the embodiments described and illustrated, but must be accorded the widest protection consistent with the principles and characteristics described and claimed herein.

Figure 1:
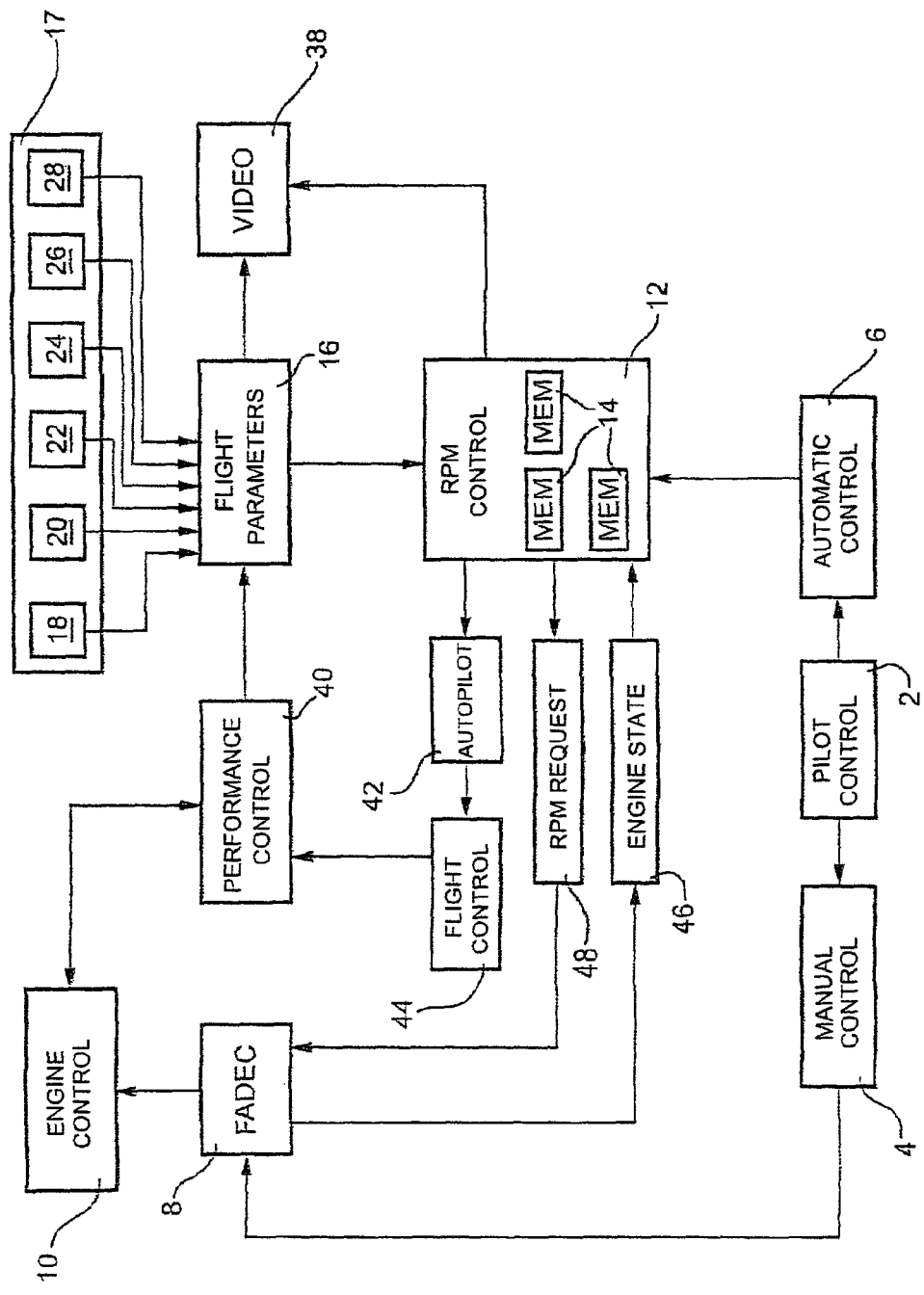
FIG. 1 shows a block diagram of one embodiment of a flight control system in accordance with the present invention.

FIG. 1 shows a block diagram of a flight control system 1 in accordance with one embodiment of the present invention. Flight control system 1 is installed on a helicopter 100 (FIG. 7) and, among other things, provides for controlling one or more engines 101 of helicopter 100, which in turn control the speed of a main rotor 102 and a tail rotor 104 of helicopter 100.

Flight control system 1 comprises a pilot control block 2, which forms an interface between the pilot (not shown) and flight control system 1 as a whole, and allows the pilot to activate a manual control mode by activating a manual control block 4, or an automatic control mode by activating an automatic control block 6.

Flight control system 1 comprises a known engine control or FADEC (Full Authority Digital Engine Control) block 8, which normally comprises an EEC (Electronic Engine Controller) or an ECU (Engine Control Unit). FADEC 8 controls all the performance aspects of the engine 101 of helicopter 100, to which the flight control system 1 belongs. More specifically, performance of engine 101 is controlled by means of an engine control block 10 connected to FADEC 8 and which forms an interface between FADEC 8 and engine 101.

When activated, manual control block 4 forms a dialog interface to ensure the pilot-entered commands are received correctly by FADEC 8, which accordingly controls operation (speed, power, etc.) of the engines by means of engine control block 10.

When manual control block 4 is activated, automatic control block 6 is disabled, and the pilot has full control of helicopter 100.

When the pilot commands pilot control block 2 to activate automatic control block 6, manual control block 4 is disabled, and FADEC 8 receives commands generated automatically by a speed control block 12, which comprises one or more memories 14 storing data by which speed control block 12 identifies the commands (typically relating to the desired speed of rotors 102, 104) to be sent to FADEC 8. The data stored in memory/memories 14 may be organized in databases (e.g. as described below with reference to FIGS. 5 and 6) stored in memory/memories 14. Speed control block 12 is connected to a flight parameter control block 16, in turn connected to a number of sensors 17, which supply flight parameter control block 16 with environment data (e.g. altitude, ground distance, ambient temperature, atmospheric pressure); data relative to the flying conditions of helicopter 100 (e.g. performance, flying speed and direction, fuel flow); and data relative to the load and/or weight condition of helicopter 100; or, furthermore, the exhaust gas temperature.

More specifically, sensors 17 comprise an environment sensor block 18 for acquiring external data, such as air temperature and/or atmospheric pressure and/or weather conditions and/or wind force and direction and/or pressure altitude (PA), etc.; a weight sensor 20 for measuring the weight of helicopter 100 (e.g. by measuring the weight on the wheels or skids of helicopter 100 on the ground); an orientation sensor 22 (e.g. a GPS receiver and/or gyrocompass) for indicating orientation and heading; an altimeter 24 for determining the height above ground level of the helicopter; one or more blade rotation speed sensors 26 for determining the speed of main rotor 102 and/or tail rotor 104; and one or more collective position sensors 28 for communicating any power demand to the engines. The helicopter may, of course, be equipped with other sensors.

Density altitude may also be derived in known manner.

In one embodiment, weight sensor 20 is also advantageously designed to indicate the actual in-flight weight of helicopter 100, e.g. to indicate a reduction in the in-flight weight of helicopter 100 due to fuel consumption, or an increase in the weight of helicopter 100 caused by loading people and/or freight onto helicopter 100 in flight, e.g. using a winch (not shown). Accordingly, weight sensor 20 is connected to a fuel level sensor (not shown), from which it acquires a residual fuel level and relates or converts the residual fuel level to the weight of fuel consumed (or, under reckoning, it acquires the weight loss due to fuel consumption). Weight sensor 20 is also connected to a further weight sensor (not shown) connected to the winch used to load people or freight onto helicopter 100, to acquire the weight of the people and/or freight loaded. In the absence of a sensor connected to the winch, the pilot may manually enter the weight, or estimated weight, of people and/or freight loaded onto helicopter 100.

Flight parameter control block 16 is also connected optionally to on-board instruments 38 (e.g. one or more videos) to provide the pilot with a graphic display of the data acquired by the above sensors.

Flight control system 1 also comprises a performance block 40 for collecting data relative to the performance (i.e. in-flight physical response) of the helicopter, and which is connected to engine control block 10, flight parameter control block 16, and by the latter to speed control block 12. Speed control block 12 is also connected to performance block 40 by an autopilot device 42 and a flight control block 44.

An increase in the speed of rotors 102, 104 by speed control block 12 produces a change in the flying direction and/or speed and/or altitude of helicopter 100. When hovering, for example, autopilot device 42, flight control block 44, and performance block 40 act synergically to maintain the flying direction and, if not changed by the pilot, also speed or altitude. Being known, operation of performance block 40, autopilot device 42, and flight control block 44 is not described in detail. Finally, performance block 40 is connected to and supplied by flight parameter control block 16 with helicopter performance information recorded and/or measured by sensors 17.

Flight control system 1 also comprises a first and second control interface block 46, 48 connecting speed control block 12 to FADEC 8. The first control interface block 46 is supplied by FADEC 8 with information about the current operating state of engine 101 (e.g. engine speed, control speed of rotors 102, 104, etc.) and supplies this information to speed control block 12. In turn, speed control block 12, on the basis of information from environment sensor block 18, weight sensor 20, orientation sensor 22, altimeter 24, blade rotation speed sensors 26, collective position sensors 28, and first control interface block 46, and the helicopter performance information from performance block 40, communicates with FADEC 8 via second control interface block 48. More specifically, speed control block 12 communicates with FADEC 8 to set the rotation speed of main rotor 102 and tail rotor 104. The FADEC 8, in turn, transmits the rotation speed to engine control block 10 which, via engine 101, rotates main rotor 102 and tail rotor 104 at the speed demanded by speed control block 12.

More specifically, speed control block 12 is supplied by flight parameter control block 16 with the information acquired by sensors 17, and accordingly commands second control interface block 48 to increase or reduce the speed of rotors 102, 104. Speed control block 12 also supplies autopilot device 42 with the information relative to the command to increase or reduce the speed of rotors 102, 104, so that autopilot device 42, via flight control block 44 and on the basis of the current helicopter performance information from performance block 40, controls the performance of helicopter 100 to keep the flying direction unchanged. Before takeoff or in flight, the pilot of helicopter 100 can select, by means of pilot control block 2, the flight characteristics best suited to the intended mission profile. For example, the pilot may select a flight that minimizes noise level and/or fuel consumption at the expense of performance, or maximizes flying power and speed at the expense of noise level and fuel consumption. Depending on the selection made by the pilot, speed control block 12 automatically controls engine 101 accordingly (to increase or reduce the speed of main rotor 102 and/or tail rotor 104), thus relieving the pilot of the responsibility of making critical decisions in terms of safety.

For example, by activating automatic control block 6, the pilot may choose between two modes: one mainly designed to privilege performance of helicopter 100 over low noise and/or fuel consumption, and the other designed to privilege low noise and fuel saving. High performance normally corresponds to high speed of rotors 102, 104 of helicopter 100, whereas minimum noise and fuel saving are achieved by reducing the speed of rotors 102, 104 compatibly with the environmental conditions and current weight of helicopter 100 (depending on the load at takeoff). Once the flight mode is selected, flight control system 1 automatically adapts speed control of main rotor 102 and tail rotor 104 to comply as closely as possible with pilot demand.

This not only has advantages during normal in-flight operation of helicopter 100, but also provides for more effective emergency control. For example, in bad weather conditions, the pilot is continually assisted by flight control system 1 automatically adjusting the speed of rotors 102, 104 (e.g. by increasing speed automatically in bad weather conditions or at particularly high altitude), thus improving safety.

Pilot control block 2 advantageously provides for selecting at least four operating modes: two manual and two automatic. The two automatic modes comprise a first high-performance automatic mode, and a second low-performance automatic mode for minimizing noise, fuel consumption, and pollutant emissions.

More specifically, the first automatic mode is used to reduce fatigue stress and increase the flight envelope. The flight envelope is defined on the basis of the basic performance of helicopter 100, in particular indicated flying speed, whose calibration is known, but also on the basis of environmental conditions, such as pressure altitude and external air temperature.

The two manual modes comprise a first and second manual mode.

In first manual mode, rotor speed, unless altered by the pilot, is fixed at a percentage value of, say, 100% of the given nominal speed.

In second manual mode, rotor speed, again unless altered by the pilot, is fixed at a percentage value of, say, 102%.

In this context, manual operating modes are intended to mean operating modes in which, within the whole flight envelope, the speeds of main and tail rotors 102, 104 are maintained constant (100% or 102%) by FADEC 8, regardless of flight parameters (temperature, flying speed, atmospheric pressure, helicopter weight, pressure altitude, density altitude, etc.). The operating range and torque range of engine 101 are controlled by the pilot, who is expected to operate as defined in the reference flight manual of helicopter 100, if the above ranges are exceeded.

Automatic operating modes, on the other hand, are intended to mean modes in which the speed of main rotor 102 and tail rotor 104 is subject to control laws (stored in memory 14 of speed control block 12) which, throughout the flight, define the optimum speed on the basis of the flight parameters from flight parameter block 16. When first or second automatic mode is activated, the speed (revolutions per minute—rpm) of rotors 102, 104 varies, as opposed to being constant.

Depending on the mode (first or second automatic mode) selected by the pilot, automatic control block 6 commands speed control block 12 to send FADEC 8 a rotor 102, 104 rpm value consistent with the mode selected (roughly speaking, a high rotor rpm in first mode, and a low rotor rpm in second mode).

Speed control block 12 transmits the required rpm of rotors 102, 104 via second control interface block 48 to FADEC 8, which interprets the rpm request and commands engine control block 10 accordingly to control engine 101 to achieve the required speed of rotors 102, 104. For safety reasons, the pilot can always intervene manually by activating manual control block 4 to override automatic control block 6.

For safety reasons, first and second automatic mode are preferably only activatable when helicopter 100 is on the ground (this can be determined, for example, on the basis of the weight recorded by weight sensor 20), and if, after startup, motor 101 driving main rotor 102 and tail rotor 104 operates within the normal envelope (100% or 102%). The pilot, however, may still select any mode, even in flight.

Figure 2:
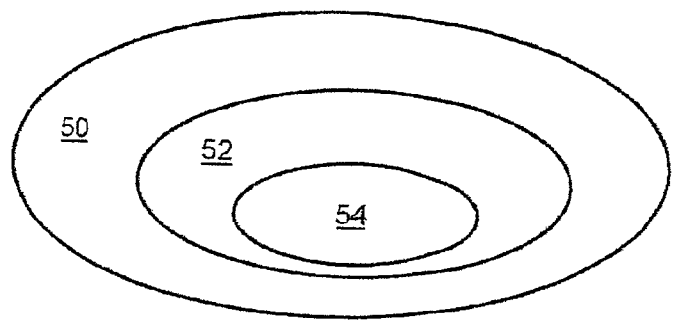
FIG. 2 shows graphically the performance relationship of different rotor speed control modes in accordance with one embodiment of the present invention.

The FIG. 2 diagram shows the relationship between the first automatic mode, second automatic mode, and manual modes in terms of performance and rotor speed control limitations.

The high-performance first automatic mode for achieving the maximum possible flight envelope is represented by area 50. The manual modes, which are subject to limitations, such as maximum take-off weight, are represented jointly by area 52 contained entirely within area 50.

The low-performance, low-consumption, low-noise second automatic mode is represented by area 54 contained entirely within area 52. The second automatic mode, in fact, has additional limitations with respect to the manual modes, e.g. additional take-off weight limitations, and maximum rotor and flying speed limitations.

Figure 3:
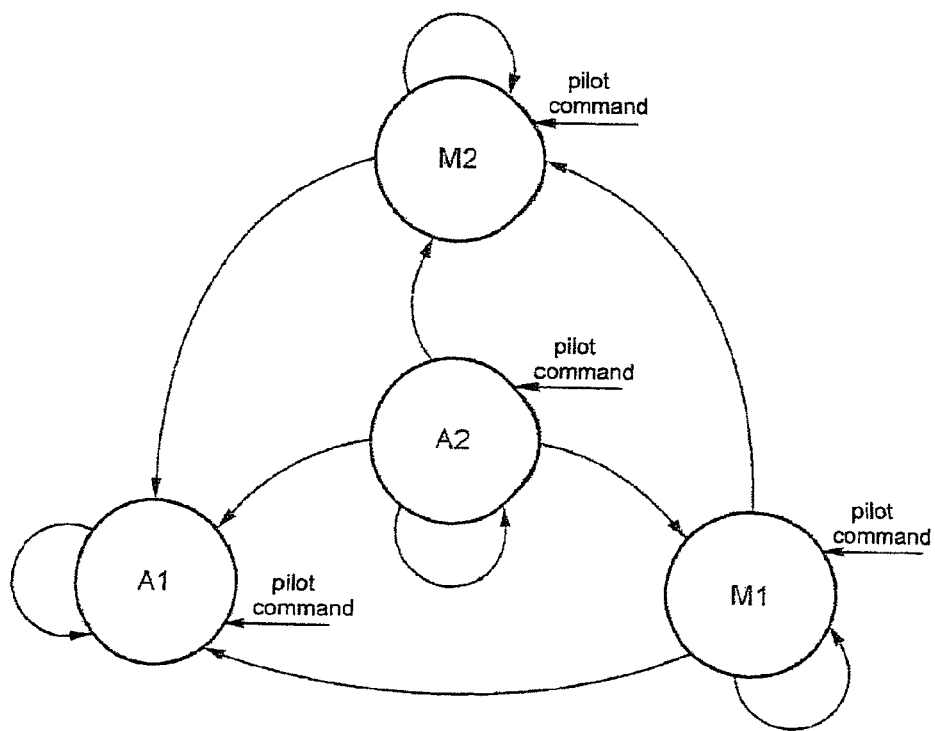
FIG. 3 shows a state diagram illustrating transitions between different flight control modes in accordance with one embodiment of the present invention.

FIG. 3 shows a state diagram illustrating switching between the two automatic modes and the two manual modes defined above, in one embodiment of the present invention. In the FIG. 3 example, switching between states is governed by conditions designed to ensure maximum flying safety, which means not all the state transitions, only transitions from low-performance states to high-performance states are permitted. As stated, the pilot, if necessary, may obviously override the automatic flight control system and force switching from any one to any other of the states in FIG. 3.

Before starting engine 101, or at any rate before takeoff, the pilot, depending on the planned mission, may select any one of: first automatic mode (state A1), second automatic mode (state A2), first manual mode (state M1), and second manual mode (state M2). Once the choice is made, helicopter 100 remains in state A1 or A2 or M1 or M2 after takeoff, pending a further command from the pilot.

As stated, state A2 is limited in terms of maximum performance (here, intended to mean maximum rpm of rotors 102, 104) to privilege low noise and consumption, and any change in the speed of rotors 102, 104 is transparent to the pilot. More specifically, in the case of steady straight horizontal flight, or when hovering, an automatic change in the speed of rotors 102, 104 caused by environmental factors produces no change in flying performance or direction, in that autopilot device 42 is activated and takes care of maintaining a stable trajectory.

State A2 being a low-performance state, it can always be exited to switch to another, higher-performance, automatic state, or to a manual state, without incurring any safety problems. Depending on pilot choice, therefore, state A2 can switch to any one of states A1, M1, M2.

In state A1, maximum performance (again intended to mean maximum rpm of rotors 102, 104) is not limited, and speed, response, and power are privileged at the expense of low noise and consumption. Being A1 an automatic state, any change in the speed of rotors 102, 104 is transparent to the pilot; and autopilot device 42 is active throughout state A1, and maintains a stable trajectory regardless of a change in the speed of rotors 102, 104.

State A1 being a maximum-flight-envelope state, it cannot be exited, on account of the other states A2, M1, M2 failing to ensure the same performance and, hence, flight safety, guaranteed by state A1.

In first manual mode M1, the speed of rotors 102, 104 is set to a predetermined value, e.g. 100%, as specified in the reference flight manual (RFM). At the pilot's discretion, however, the predetermined value can be changed, and the pilot has full control of helicopter 100. Unless commanded by the pilot, the speed of rotors 102, 104 is not changed automatically alongside a change in environmental conditions and/or the weight of helicopter 100, and remains fixed at the predetermined or pilot-set value.

In second manual mode M2, the speed of rotors 102, 104 is set to a predetermined value higher than that of first manual mode M1, e.g. 102%, as specified in the reference flight manual (RFM). Second manual mode M2 is suitable, for example, when taking off or landing in confined spaces calling for intricate manoeuvring by the pilot. In this case, too, the predetermined rotor speed can be changed at the pilot's discretion, and, unless commanded by the pilot, the speed of rotors 102, 104 remains fixed.

State M1 can be switched by the pilot to state A1 or M2. And state M2 can be exited by the pilot, but, in the embodiment shown, can only be switched to state A1, on account of the other states failing to ensure the same, or superior, performance as state M2.

Figure 4:
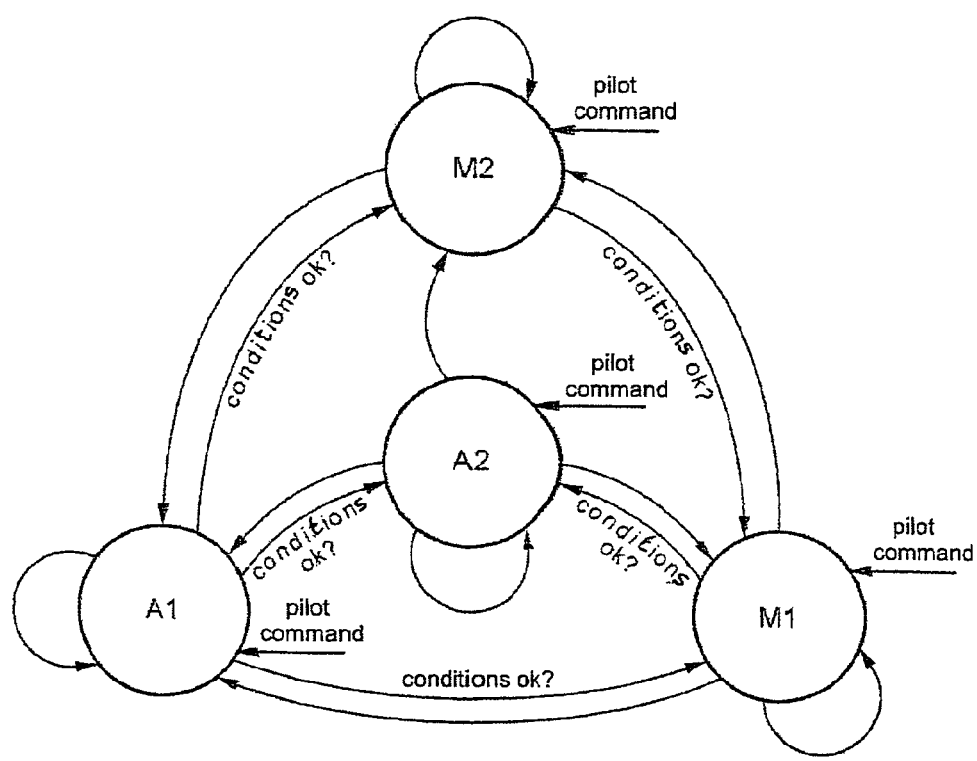
FIG. 4 shows a state diagram illustrating transitions between different flight control modes in accordance with a further embodiment of the present invention.

FIG. 4 shows a state diagram similar to the one in FIG. 3, relative to a further embodiment of the present invention, and in which the same states are indicated using the same references, with no further description. Unlike the one in FIG. 3, the FIG. 4 state diagram provides for two-way switching to and from any of states A1, A2, M1, M2. Switching from a high-performance state (e.g. A1) to a low-performance state (e.g. A2), however, is subject to one or more conditions, and only if these conditions are met does flight control system 1 permit high- to low-performance state transitions. If even only one of the conditions is not met, high- to low-performance state switching is not authorized, and the high-performance state is maintained.

More specifically, because it involves reducing the speed of rotors 102, 104, switching from one of states A1, M1, M2 to state A2 depends on the weight of helicopter 100 (recorded, as stated, by weight sensor 20 and updated in flight on the basis of fuel consumption and loads acquired or lost in flight), which must be below a given predetermined threshold and evaluated in relation to flying speed and altitude.

Switching from high-performance state A1 to state M1 or M2 is permitted unconditionally, if it does not involve reducing the speed of rotors 102, 104. Conversely, it is subject to evaluating the total weight of helicopter 100, as when switching from one of states A1, M1, M2 to state A2.

Being manual states, in which the pilot has full control of helicopter 100, switching from state M2 to state M1 may be permitted by simply determining the pilot's actual intention to make the switch. Alternatively, or in addition, the weight of helicopter 100 may also be checked, and the switch permitted only if the weight is below a predetermined threshold.

In a further embodiment (not shown), switching from high-performance states to lower-performance states is permitted regardless of specific conditions (e.g. the weight of helicopter 100) being complied with, though provision may advantageously be made for a pilot warning alerting the pilot to the fact that certain conditions are not met, and leaving it up to the pilot to decide whether or not to switch states.

The flight envelope permitted in states A1 and A2 (first and second automatic mode) is divided into operating zones, each of which, depending on the mode selected, is associated with a given speed of rotors 102, 104.

The operating zones are stored, for example, in a database in turn stored in memories 14 of speed control block 12. For each automatic mode (states A1 and A2 in FIGS. 3 and 4), each storage location of the respective database is unequivocally addressed on the basis of the value assumed by one or more of the parameters considered, e.g. flying speed and altitude, and evaluated jointly.

Figure 5:
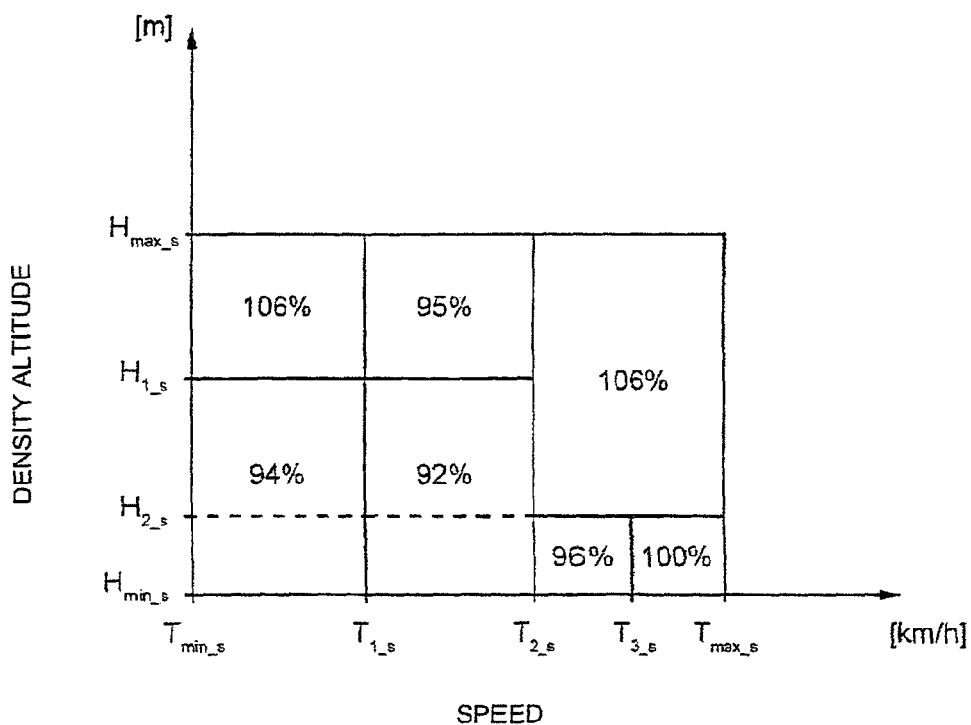
FIG. 5 shows, in table form, a database containing rotor speeds alongside variations in density altitude and flying speed in an automatic low-noise flight control mode.

FIG. 5 shows, in table form, a database containing rotor speed values alongside variations in altitude, here intended as density altitude, (vertical axis), and flying speed (horizontal axis). More specifically, the FIG. 5 table relates to operation of rotors 102, 104 in second automatic mode (state A2 in FIGS. 3 and 4) to privilege low noise and minimum fuel consumption.

Each operating zone indicated by a flying speed range and by a density altitude range (i.e. each box in the table) corresponds to a given speed of rotors 102, 104.

As shown in FIG. 5, at flying speeds between a minimum value $T_{min\_s}$ of, say, 0 km/h, and a first value $T_{1\_s}$ of, say, 93 km/h, and at density altitudes between a minimum value $H_{min\_s}$ of, say, roughly −2000 m, and a first value $H_{1\_s}$ of, say, roughly 5000 m, rotors 102, 104 are driven at 94% speed. Maintaining flying speed between $T_{min\_s}$ and $T_{1\_s}$, but increasing density altitude above first value $H_{1\_s}$ (but still within a maximum permitted altitude $H_{max\_s}$ of, say, roughly 6000 m), rotors 102, 104 are driven at a higher speed of 106%. This is necessary for safety reasons, in that, for a given control margin, the relatively low flying speed and the rarefied air at high altitudes call for an increase in the speed of rotors 102, 104 to sustain helicopter 100 in flight. As shown in FIG. 5, at higher flying speeds between first value $T_{1\_s}$ and a second value $T_{2\_s}$ of, say, 200 km/h, and at the same density altitude as before, rotors 102, 104 can be driven at lower speed. That is, at flying speeds between $T_{1\_s}$ and $T_{2\_s}$, and at a density altitude between $H_{min\_s}$ and $H_{1\_s}$, rotors 102, 104 are driven at 92% speed; and, maintaining flying speed within the above range, and increasing density altitude to between first value $H_{1\_s}$ and maximum value $H_{max\_s}$, rotors 102, 104 are driven at 95% speed.

An increase in flying speed above $T_{2\_s}$ calls for a corresponding increase in the speed of rotors 102, 104. At low density altitudes between minimum value $H_{min\_s}$ and an intermediate value $H_{2\_s}$ of, say, 2800 m, and at flying speeds between second value $T_{2\_s}$ and a third value $T_{3\_s}$ of, say, 260 km/h, rotors 102, 104 are driven at 96% speed. At the same density altitude, but at higher flying speeds up to a maximum value $T_{max\_s}$ of, say, 310 km/h, rotors 102, 104 are driven at 100% speed. At high flying speeds (above second value $T_{2\_s}$) and high density altitudes (above intermediate value $H_{2\_s}$), rotors 102, 104 are driven at maximum speed—106% in the example described.

Noise and fuel consumption can thus be minimized at low flying speeds and altitude, while at the same time guaranteeing safety and power (when needed) to reach high flying speeds and altitude.

As shown in FIG. 5 and the above description, the change in the speed of rotors 102, 104 alongside changes in density altitude and/or flying speed is made discretely, in predetermined steps, as opposed to continuously.

Obviously, switching from one speed of rotors 102, 104 to another includes a transition stage, in which speed increases or decreases gradually to the target value in a stair-step profile, and in which the size of the steps ranges between 1% and 10% of the start and target speed range.

In one embodiment of the present invention, a change in the speed of rotors 102, 104 may be commanded on the basis of parameters in addition to flying speed and density altitude, and also on the basis of environmental conditions.

In another embodiment of the present invention, a change in the speed of rotors 102, 104 may be commanded on the basis of parameters other than flying speed and density altitude, and more specifically on the basis of one, two or more flight quantities indicating aircraft flying speed, density altitude, pressure altitude, aircraft weight, height above ground level, orientation, flying direction, air temperature, atmospheric pressure, weather conditions, and wind force and direction.

In one embodiment of the present invention, in addition to or instead of one or more of the above-listed parameters, a change in the speed of rotors 102, 104 is advantageously commanded on the basis of an automatically recorded or pilot-entered change in the in-flight weight of helicopter 100 (weight loss through fuel consumption, or weight increase of people or freight winched on board in flight).

The FIG. 5 table is obviously purely indicative, and may comprise more or fewer operating zones.

Figure 6:
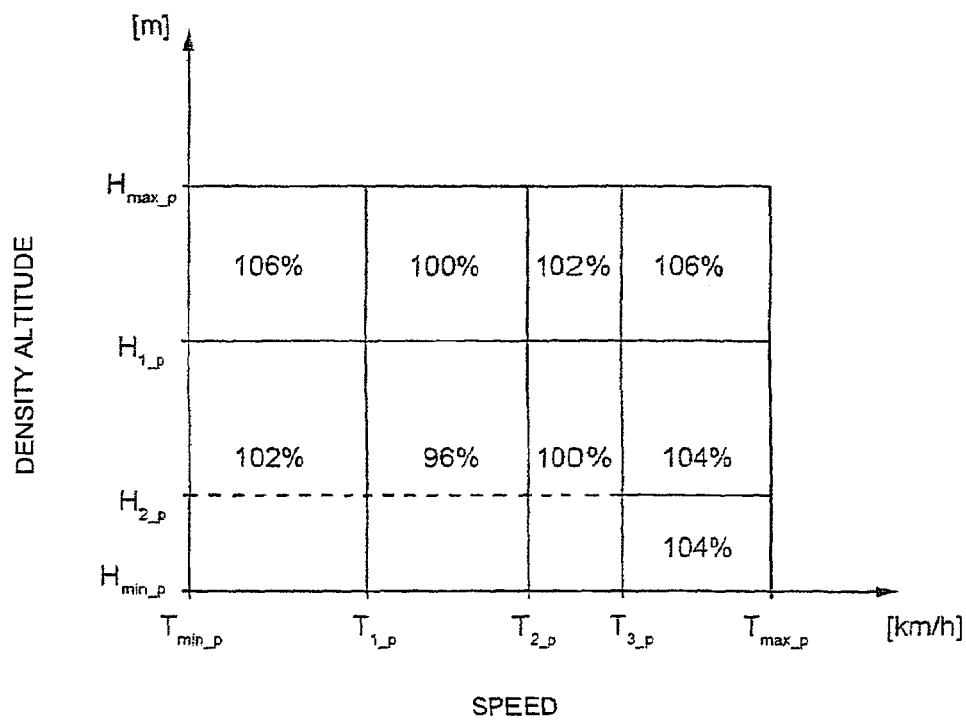
FIG. 6 shows, in table form, a database containing rotor speeds alongside variations in density altitude and flying speed in an automatic high-performance flight control mode.

As in FIG. 5, FIG. 6 shows, in table form, another database containing speed values of rotors 102, 104 alongside variations in altitude, here intended as density altitude, (vertical axis), and flying speed (horizontal axis). More specifically, the FIG. 6 table relates to operation of rotors 102, 104 in high-performance first automatic mode (state A1 in FIGS. 3 and 4).

In this case, too, each operating zone indicated by a flying speed range and by a density altitude range (i.e. each box in the table) corresponds to a given speed of rotors 102, 104.

At flying speeds between a minimum value $T_{min\_p}$ of, say, 0 km/h, and a first value $T_{1\_p}$ of, say, 93 km/h, and at density altitudes between a minimum value $H_{min\_p}$ of, say, roughly −2000 m, and a first value $H_{1\_p}$ of, say, 5000 m, rotors 102, 104 are driven at 102% speed. Maintaining flying speed between $T_{min\_p}$ and $T_{1\_p}$, but increasing density altitude above first value $H_{1\_p}$ (but still within a maximum permitted altitude $H_{max\_p}$ of, say, 6000 m), rotors 102, 104 are driven at a higher speed of 106%. At higher flying speeds between first value $T_{1\_p}$ and a second value $T_{2\_p}$ of, say, 200 km/h, and at the same density altitude as before, rotors 102, 104 can be driven at lower speed. That is, at flying speeds between $T_{1\_p}$ and $T_{2\_p}$, and at a density altitude between $H_{min\_p}$ and $H_{1\_p}$, rotors 102, 104 are driven at 96% speed; and, maintaining flying speed within the above range, and increasing density altitude to between first value $H_{1\_p}$ and maximum value $H_{max\_p}$, rotors 102, 104 are driven at 100% speed.

An increase in flying speed above $T_{2\_p}$ calls for a corresponding increase in rotor speed. At flying speeds between second value $T_{2\_p}$ and a third value $T_{3\_p}$ of, say, 260 km/h, rotors 102, 104 are driven at 100% speed up to first density altitude value $H_{1\_p}$, and at 102% speed above first density altitude value $H_{1\_p}$.

At higher flying speeds, rotors 102, 104 are driven at 102% speed at low density altitudes between minimum value $H_{min\_p}$ and an intermediate value $H_{2\_p}$ of, say, 2800 m, and at flying speeds between third value $T_{3\_p}$ and a maximum value $T_{max\_p}$ of, say, 325 km/h. At flying speeds within the same range, but at higher density altitudes between $H_{2\_p}$ and $H_{1\_p}$, rotors 102, 104 are driven at 104% speed. At even higher density altitudes between $H_{1\_p}$ and maximum value $H_{max\_p}$, rotors 102, 104 are driven at maximum speed, which is of 106% in the example described.

As in FIG. 5, the FIG. 6 table may comprise more or fewer operating zones, and a change in the speed of rotors 102, 104 may be commanded on the basis of parameters in addition to flying speed and density altitude, and also on the basis of environmental conditions. For example, a change in the speed of rotors 102, 104 may be commanded on the basis of parameters other than flying speed and density altitude, and more specifically on the basis of one, two or more flight quantities indicating aircraft flying speed, density altitude, pressure altitude, aircraft weight, height above ground level, orientation, flying direction, air temperature, atmospheric pressure, weather conditions, and wind force and direction, or on the basis of a change in weight of helicopter 100 recorded in flight or entered by the pilot.

As shown in FIG. 6 and stated with reference to FIG. 5, the change in the speed of rotors 102, 104 alongside changes in density altitude and/or flying speed is made discretely, in predetermined steps, as opposed to continuously. Obviously, in this case, too, switching from one speed of rotors 102, 104 to another includes a transition stage, in which speed increases or decreases gradually to the target value in a stair-step profile, and in which the size of the steps ranges between 1% and 10% of the start and target speed range.

With reference to both FIGS. 5 and 6, flight parameters and environmental condition information are preferably acquired at fixed, predetermined time intervals. For safety reasons, automatic switching from one operating zone to another (the operating zones shown in FIGS. 5 and 6) is subject to congruency checks, such as determining density altitude, ground distance, temperature, flying speed, current speed of rotors 102, 104, and, on the basis of the acquired information and parameters, the target speed of rotors 102, 104, and continuance of density altitude and flying speed conditions for a given period of time.

The outcome of the above recordings must be evaluated in relation to appropriate tolerance ranges and time-change gradients, to prevent the automatic system from kicking in at unstable, transient flight stages.

Switching from one operating zone to another (i.e. from one rotor speed to another, as shown in tables 5 and 6) occurs gradually in predetermined steps, e.g. by adjusting rotor speed by ±1% per second for speed changes up to 5%, and by ±2% per second for speed changes of over 5%. Given a start speed and target speed of rotors 102, 104, the speed of rotors 102, 104 only remains between the start and target speeds for as long as it takes to increase or reduce the speed of rotors 102, 104.

Figure 7:
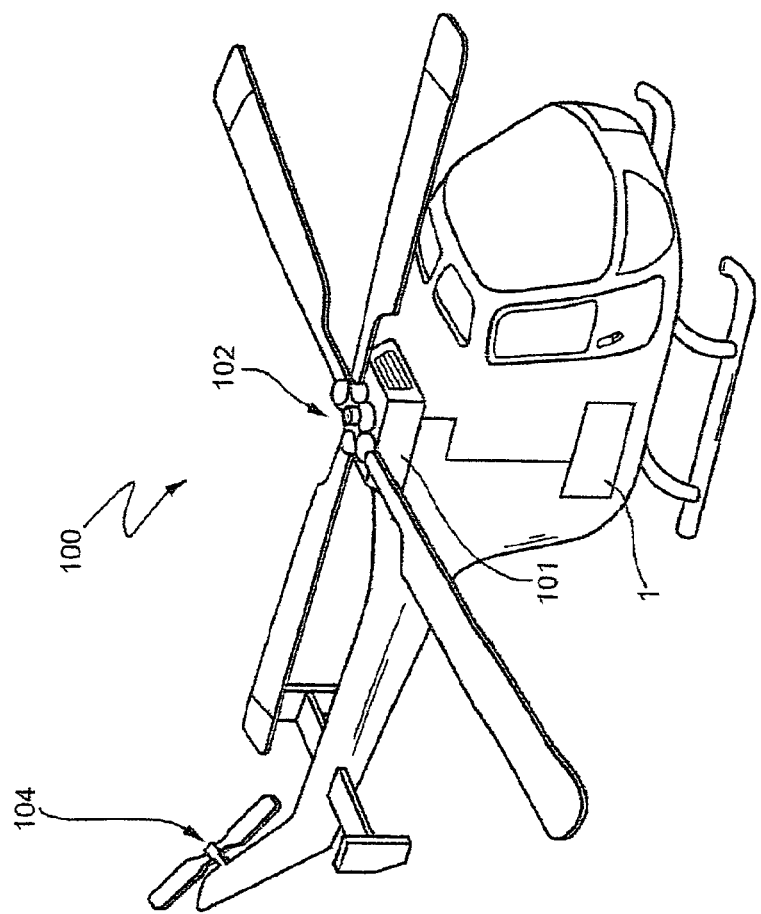
FIG. 7 shows a helicopter equipped with the FIG. 1 flight control system.

In the event of rapid disengagement of rotor speed from engine speed (as when entering autorotation), stable rotor control must be ensured, to enable it to adapt to changes in speed caused by external conditions, even at zero power (idle flight). FIG. 7 shows a helicopter 100 comprising a main rotor 102 and a tail rotor 104 driven by respective motors or the same motor (only one motor 101 is shown in FIG. 7); and a flight control system 1 as described and illustrated in FIGS. 1-6.

Alternatively, helicopter 100 in FIG. 7 may be a single-rotor type.

The advantages of the present invention will be clear from the foregoing description.

In particular, the system according to the invention combines versatility and adaptability. Versatility in the sense that the pilot can select the overall capabilities of the aircraft best suited to the mission profile; and adaptability in the sense that, once one of the automatic flight modes is selected, the aircraft automatically adapts rotor speed to current environmental conditions, thus relieving the pilot from having to constantly monitor rotor speed as a function of environmental parameters, especially in critical flying conditions, thus greatly enhancing flying safety.

Clearly, changes may be made to the system as described and illustrated herein without, however, departing from the scope of the present invention as defined in the accompanying claims.

The invention claimed is:

1. A flight control system that is electronic and is for an aircraft capable of hovering and comprising at least one rotor, the flight control system comprising:

a manual flight control mode that the flight control system is configured to operate in, in which the flight control system controls rotor speed in response to direct commands from a pilot; and at least two automatic flight control modes that the flight control system is configured to operate in corresponding to respective flight modes of the aircraft, and in which the flight control system controls the rotor speed automatically on a basis of flight conditions;

the flight control system being characterized by also being configured to:

memorize, for each of said automatic flight control modes, a respective flight table relating different speed values of said rotor to different values of at least one flight quantity; and automatically control the rotor speed in said automatic flight control modes on a basis of the respective flight tables.

2. The flight control system as claimed in claim 1, wherein the values of said at least one flight quantity in each respective flight table are divided into ranges, each associated with a corresponding rotor speed value.

3. A flight control system as claimed in claim 1, and also configured to control switching between different rotor speed values in the same automatic flight control mode automatically and in stair-step profiles.

4. A flight control system as claimed in claim 3, wherein the stair-step profiles have a size of steps in ranges between 1% and 10% of a range spanned by values between which switching is performed.

5. A flight control system as claimed in claim 1, and wherein said automatic flight control modes are such that the aircraft flies in:

a low-noise and/or low-fuel-consumption flight mode; and a high-performance flight mode.

6. A flight control system as claimed in claim 5, wherein said high-performance flight mode is such as to maximize a flight envelope.

7. A flight control system as claimed in claim 1, wherein said flight table relates different speed values of said rotor to different values of at least two different flight quantities; and the values of the at least two different flight quantities in each flight table are divided into areas, each associated with a corresponding rotor speed value.

8. A flight control system as claimed in claim 7, wherein said at least two different flight quantities are selected from quantities indicating aircraft flying speed, density altitude, pressure altitude, height above ground level, aircraft weight, orientation, flying direction, air temperature, atmospheric pressure, weather conditions, and wind force and direction.

9. A flight control system as claimed in claim 1, and also configured to automatically control switching between the two automatic flight control modes in response to pilot command.

10. A flight control system as claimed in claim 9, and also configured to enable or disable switching between the two automatic flight control modes on a basis of an in-flight weight of the aircraft.

11. A flight control system that is electronic and is for an aircraft capable of hovering and comprising at least one rotor, the flight control system comprising:

a manual flight control mode that the flight control system is configured to operate in, in which the flight control system controls rotor speed in response to direct commands from a pilot; and at least two automatic flight control modes that the flight control system is configured to operate in corresponding to respective flight modes of the aircraft, and in which the flight control system controls the rotor speed automatically on a basis of flight conditions;

the flight control system being characterized by also being configured to:

memorize, for each of said automatic flight control modes, a respective flight table relating different speed values of said rotor to different values of at least one flight quantity; and automatically control the rotor speed in said automatic flight control modes on a basis of the respective flight tables, wherein the electronic flight control system is in the aircraft.

12. A computer readable non-transitory memory storing instructions, which when executed by a computer system results in providing a flight control system that is electronic and is for an aircraft capable of hovering and comprising a main rotor and a tail rotor, comprising:

providing a manual flight control mode, in which the flight control system controls rotor speed in response to direct commands from a pilot;

providing at least two automatic flight control modes corresponding to respective flight modes of the aircraft, and in which the flight control system controls the rotor speed automatically on a basis of flight conditions;

providing, for each of said automatic flight control modes, a respective flight table relating different speed values of said rotor to different values of at least one flight quantity; and automatically controlling the rotor speed in said automatic flight control modes on a basis of the respective flight tables.

* * * * *